(12) United States Patent
Zhou

(10) Patent No.: US 11,094,992 B2
(45) Date of Patent: Aug. 17, 2021

(54) BATTERY

(71) Applicant: Ningde Amperex Technology Limited, Fujian (CN)

(72) Inventor: Bolin Zhou, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 354 days.

(21) Appl. No.: 16/166,142

(22) Filed: Oct. 21, 2018

(65) Prior Publication Data
US 2019/0157637 A1    May 23, 2019

(30) Foreign Application Priority Data

Nov. 17, 2017    (CN) .......................... 201721567327.2

(51) Int. Cl.
| | |
|---|---|
| *H01M 10/0525* | (2010.01) |
| *H01M 2/10* | (2006.01) |
| *H01M 50/209* | (2021.01) |
| *H01M 10/04* | (2006.01) |
| *H01M 50/10* | (2021.01) |
| *H01M 50/24* | (2021.01) |
| *H01M 50/116* | (2021.01) |
| *H01M 50/183* | (2021.01) |

(52) U.S. Cl.
CPC ..... *H01M 50/209* (2021.01); *H01M 10/0436* (2013.01); *H01M 10/0525* (2013.01); *H01M 50/10* (2021.01); *H01M 50/116* (2021.01); *H01M 50/183* (2021.01); *H01M 50/24* (2021.01)

(58) Field of Classification Search
None
See application file for complete search history.

(56) References Cited

U.S. PATENT DOCUMENTS

2017/0005300 A1*    1/2017    Kodama ................. H01M 2/08

* cited by examiner

*Primary Examiner* — Haroon S. Sheikh
(74) *Attorney, Agent, or Firm* — Morgan, Lewis & Bockius LLP

(57) ABSTRACT

The present application relates to the field of energy storage device production technology, in particular, to a battery comprising a battery body and a flange portion; the battery body includes a first side face protruding from a surface of the battery body; the flange portion is arranged outside the battery body and includes a protrusion segment connected to the battery body, the protrusion segment protruding away from the battery body. The present application ensures the amount of glue at the valley bottom of the side as much as possible, so that the adhesive force here is improved, the tightness of the valley bottom is ensured and the problem of opening the flange portion when transporting, using, or storing is reduced as much as possible.

17 Claims, 1 Drawing Sheet

BATTERY

CROSS REFERENCE TO RELATED APPLICATIONS

The present application claims the benefit of Chinese Patent Application No. 201721567327.2 filed on Nov. 17, 2017. All the above are hereby incorporated by reference.

FIELD OF THE APPLICATION

The present application relates to the field of energy storage device production technologies, in particular, to a battery.

BACKGROUND OF THE APPLICATION

A battery, such as a soft pack battery in a lithium-ion battery, generally has a battery side seal nestling the side of the battery, and the nestled side seal is a vertical structure along the thickness direction of the battery. This structure has poor sealing reliability and increases the space occupying by the side of the battery.

SUMMARY OF THE APPLICATION

The present application provides a battery, which may solve above problems.

The present application provides a battery characterized by comprising a battery body and a flange portion, the battery body includes a side face protruding from a surface of the battery body;

The flange portion is arranged outside the battery body and includes a protrusion segment connected to the battery body, the protrusion segment protruding away from the battery body.

Preferably, the flange portion further includes an ending segment connected to an end of the protrusion segment and located between the protrusion segment and the side face.

Preferably, the battery body includes a first plane and a second plane in a thickness direction of the battery body, the protrusion segment is curved from an end of the second plane toward a side where the first plane is located; a connection between the ending segment and the protrusion segment is a starting end of the ending segment, and the distance of the starting end of the ending segment from the first plane is 0.2 to 0.5 mm.

Preferably, in the thickness direction of the battery body, the distance of the end of the ending segment from a central plane of the battery body is greater than 0.2 mm, and the end of the ending segment is located between the first plane and the central plane.

Preferably, the battery further includes an adhesive layer, the adhesive layer is disposed between at least two of the protrusion segment, the ending segment and the side face.

Preferably, in the thickness direction of the battery, a unit mass of the adhesive layer is 0.1 to 0.25 mg/mm.

Preferably, a valley bottom of the side face is opposite to a valley bottom of the protrusion segment.

Preferably, in the thickness direction of the battery body, a starting end of the ending segment is located between the first plane and the second plane.

Preferably, the protrusion segment is of a curved structure.

Preferably, the curved structure includes an elliptical arc or a circular arc.

The technical solution provided by the present application may achieve the following beneficial effects:

The battery provided by the present application includes a battery body and a protrusion segment, the protrusion segment protruding away from the battery body, so that the gap between the protrusion segment and the valley bottom of the side face of the battery body will not become smaller sharply to avoid the glue at the valley bottom to decrease due to the squeeze, so that the amount of glue in the valley bottom can be guaranteed for improving the adhesive force there, and the tightness of the valley bottom and protrusion segment may be further guaranteed to reduce the problem of opening the flange portion when transporting, using, or storing is reduced as much as possible.

The above general description and the following detailed description are merely exemplary and are not intended to be limiting.

BRIEF DESCRIPTION OF THE ACCOMPANYING DRAWINGS

The drawings herein are incorporated in and constitute a part of the specification. Embodiments consistent with the present application are shown and used in conjunction with the specification to explain the principles of the application.

DETAILED DESCRIPTION OF THE PREFERRED EXAMPLES

The present application will be further described in detail below through the specific embodiments and the accompanying drawings.

Figure 1:
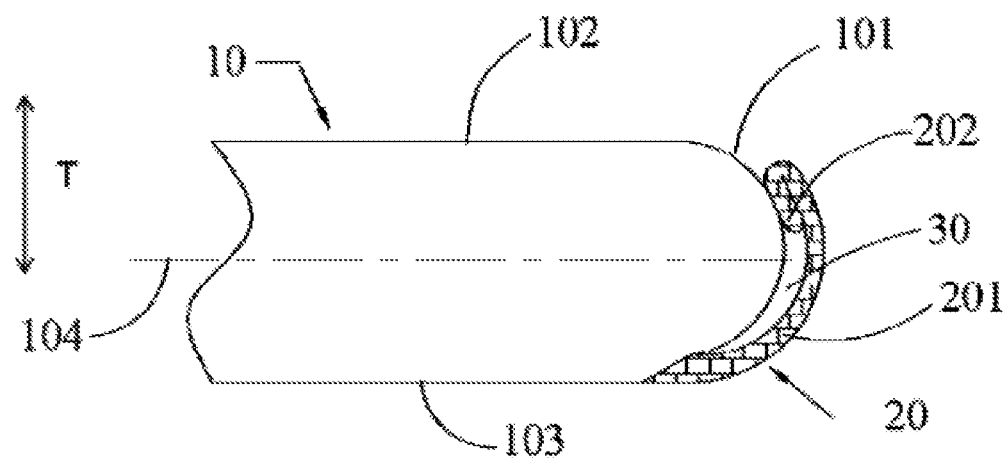
FIG. 1 is a structural view of a specific embodiment of a battery provided by the present application.

The embodiment of the present application provides a battery, which may be a soft pack battery, or the battery may be a laminated battery in terms of processing technology. The battery includes a battery body 10 and a flange portion 20, and a bare battery is wrapped in the battery body 10. As shown in FIG. 1, the width direction of the battery body 10 is a horizontal direction, the thickness direction T is a vertical direction, and the height direction is a direction perpendicular to the horizontal direction and the vertical direction.

Specifically, the battery body 10 includes a side face 101, and a first plane 102 and a second plane 103 arranged in the thickness direction of the battery body 10. The first plane 102 and the second plane 103 are respectively connected at both ends of the side face 101; in the thickness direction of the battery body 10, the first plane 102 is opposed to the second plane 103. In the height direction of the battery body 10, the projection of the side face 101 protrudes toward the outside of the battery body 10, i.e., the side face 101 is formed with a protrusion structure from one end close to the first plane 102 to another one end close o the second plane 103, and protrudes away from the battery.

In the width direction of the battery body 10, the flange portion 20 is opposed to the side face 101. The flange portion 20 includes a protrusion segment 201 connected to the battery body 10, and the protrusion segment 201 protrudes away from the battery body 10. It may be understood that in the height direction of the battery body 10, the projection of the protrusion segment 201 protrudes away from the projection of the battery body 10, i.e., the protrusion segment 201 is also a protrusion structure, and the protrusion segment 201 has a protrude direction the same to a protrude direction of the side face 101.

In above structure, the side face 101 of the battery body 10 and the protrusion segment 201 are both protrusion structures, and the protrusion directions of the two are the same. In embodiments, the glue is coated and dripped to the flange portion 20, and since the protrusion segment 201 has the protrusion structure, it is possible to avoid the problem of the gap reduction between the flange portion 20 and the side face 101 caused by the vertical arrangement of the flange portion in the prior art at the valley bottom of the side face 101, so that there is still enough gap between the valley bottom of the side face 101 and the flange portion 20 to accommodate more glue for preventing glue from decreasing due to the squeeze and increasing the adhesive force there, thereby ensuring the tightness of the valley bottom and the protrusion segment 201 and reducing the problem of opening the flange portion 20 when transporting, using, or storing as much as possible.

It is to be understood that the flange portion 20 may comprise only the protrusion segment 201; one end of the protrusion segment 201 is connected to the battery body 10, and the other end is bonding fixed to the battery body 10. It is also possible that the flange portion 20 includes the protrusion segment 201 and an ending segment 202, and the ending segment 202 is connected to an end of the protrusion segment 201 (the end of the protrusion segment 201 refers to the end of the protrusion segment 201 away from the connection with the battery body 10); and the ending segment 202 is connected to the side face 101, i.e., the end of the protrusion segment 201 is connected to the battery body 10 through the ending segment 202.

Among them, the ending segment 202 and the protrusion segment 201 may be arranged in the thickness direction of the battery body 10, i.e., in the thickness direction of the battery body 10, there is no overlapping parts between the projection of the ending segment 202 and the projection of the protrusion segment 201.

Whether the flange portion 20 includes only the protrusion segment 201 or the ending segment 202 is disposed in the thickness direction T of the battery body 10, when the flange portion 20 is press-bonded to the battery body 10, the glue flows out along the extending direction of the flange portion 20 and the battery may be bonded to other members during subsequent assembly or transportation. In order to solve above problem, the ending segment 202 is located between the protrusion segment 201 and the battery body 10, i.e., in the width direction of the battery body 10, the projection of the ending segment 202 overlaps with the projection of the protrusion segment 201, that is, the ending segment 202 at least partially overlaps with the protrusion segment 201; and the ending segment 202 is located on the side of the protrusion segment 201 close to the battery body 10, so when the flange portion 20 is press-bonded to the battery body 10, the ending segment 202 may prevent the glue between the protrusion segment 201 and the battery body 10 from flowing out as much as possible, thereby ensuring the adhesive force between the flange portion 20 and the battery body 10.

It is to be understood that the protrusion segment 201 is bent from the end of the second plane 103 toward the side where the first plane 102 is located, and the ending segment 202 is bent from the end of the protrusion segment 201 to the side where the second plane 103 is located. In order to prevent the ending segment 202 from extending out of the battery body 10, the distance from the connection of the ending segment 202 and the protrusion segment 201 to the first plane is 0.2 to 0.5 mm, that is, the distance may be 0.2 mm, 0.3 mm, 0.45 mm, or 0.5 mm. Of course, the distance from the connection of the ending segment 202 and the protrusion segment 201 to the first plane may be less than 0.2 mm, such as 0.19 mm, 0.15 mm, 0.1 mm, etc.; or the distance may be larger than 0.5 mm, such as 0.55 mm, 0.6 mm, or 0.7 mm, etc.

Generally, the valley bottom of the side face 101 is located close to the central plane 104, and the central plane 104 (which is a non-solid structure) refers to a center plane of the battery body 10 which is parallel to the width direction and the height direction simultaneously. If the end of the ending segment 202 (the end of the ending segment 202 refers to the end of the ending section 202 away from its connection with the protrusion segment 201) extends to the second plane 103 for a longer length, even exceeding the central plane 104, the gap between the valley bottom of the side face 101 and the flange portion 20 is reduced. Therefore, the distance from the end of the ending segment 202 to the central plane 104 of the battery body 10 is greater than 0.2 mm, such as 0.21 mm, 0.25 mm, 0.3 mm, 0.4 mm, etc., and the ending segment 202 is located on the side of the central plane close to the first plane 102. Of course, the distance from the end of the ending segment 202 to the central plane 104 of the battery body 10 may be less than or equal to 0.2 mm, such as 0.2 mm, 0.18 mm, 0.15 mm, 0.1 mm.

It is to be understood that the ending segment 202 may only have a distance of 0.2 to 0.5 mm from the connection of the protrusion segment 201 therewith to the first plane 102, or the distance from the end of the ending segment 202 to the central plane 104 is larger than 0.2 mm. Preferably, the distance from the connection of the ending segment 202 and the protrusion segment 201 to the first plane 102 is 0.2 to 0.5 mm, and the distance from the end of the ending segment 202 to the central plane 104 is larger than 0.2 mm, at the same time, the ending segment 202 is located at the side of the central plane 104 close to the first plane 102.

In each of above embodiments, in order to further increase the gap between the valley bottom of the side face 101 and the flange portion 20, the valley bottom of the side face 101 is opposed to the valley bottom of the protrusion segment 201. Optionally, the direction of the valley bottom of the side face 101 pointing to the valley bottom of the protrusion segment 201 is parallel to the width direction of the battery body 10. It should be noted that the valley bottom of the side face 101 may be opposed to other parts of the protrusion segment 201.

The protrusion segment 201 may be an elliptical arc structure, a circular arc structure, a V-shaped structure, or the like. Generally, in the width direction of the battery body 10, the side face 101 is a arc-shaped structure, in particular, the side of the soft pack battery. However, there is a certain separator displacement in the width direction of the laminated battery, and the separator is a compressible structure. Therefore, in order not to increase the thickness of the laminated battery, the sides of the laminated battery are also prepared in an arc shape. Correspondingly, the projection of the protrusion segment 201 in the height direction is also an arc structure, so that the protrusion segment 201 and the side face 101 are contoured design, further increasing the gap between the side face 101 and the protrusion segment 201 to ensure the amount of the glue therebetween. The above-mentioned arc-shaped structure may comprise an elliptical arc structure or a circular arc structure, preferably a circular arc structure, as shown in FIG. 1, to facilitate the manufacture.

When the protrusion segment 201 has a circular arc structure, the central angle of the circular arc structure is 0° to 90°, such as 0°, 15°, 30°, 45°, 70°, 80°, 90°, etc. Especially when the distance from the connection of the ending segment 202 and the protrusion segment 201 to the first plane 102 is larger than 0.2 mm, the gap between the protrusion segment 201 and the side face 101 is made larger at the valley bottom of the side face 101 by the bending of the protrusion segment 201 to further prevent the extrusion of the glue. Of course, the central angle of the circular arc structure may also be larger than 90°, such as 95°, 100°, 110° etc.

Further, in order to ensure that the flange portion 20 does not extend go beyond the battery body 10, the outer contour of the projection of the battery body 10 surrounds the outer contour of the projection of the flange portion 20 in the width direction of the battery body 10, that is, the projection of the flange portion 20 may be located within the outer contour of the projection of the battery body 10 in the width direction of the battery body 10; it is also possible that the outer contour of the projection of the flange portion 20 coincides with the outer contour of the projection of the battery body 10; or a portion of the outer contour of the projection of the flange portion 20 coincides with the outer contour of the projection of the battery body 10, with the remainder being located within the outer contour of the projection of the battery body 10. As shown in FIG. 1, in the thickness direction of the battery body 10, the flange portion 20 includes a first end and a second end, and in the width direction of the battery body 10, the projection of the first end coincides with the second plane 103, the projection of the second end being located between the projection of the first plane 102 and the projection of the second plane 103.

Generally, the battery further includes an adhesive layer 30. The adhesive layer 30 may be a hot melt glue, such as an acrylate structural glue, a polyurethane hot melt glue or an epoxy structural glue. Any adjacent two of the protrusion segment 201, the ending segment 202, and the side face 101 are bonded by the adhesive layer 30, i.e., two opposite portions of the protrusion segment 201 and the ending segment 202, two opposite portions of the protrusion segment 201 and the battery body 10 and two opposite portions of the ending segment 202 and the battery body 10 are all bonding fixed by the adhesive layer 30, so that the fit between each portion of the flange portion 20 and between the flange portion 20 and the battery body 10, are ensured, to further prevent the opening of the flange portion 20 during transportation, use, or placement.

In each of above embodiments, in order to ensure that the flange portion 20 and the battery body 10 are pressed and adhered without the overflowing of the glue while ensuring the fit between the flange portion 20 to the battery body 10, the unit mass of the adhesive layer 30 is 0.1 to 0.25 mg/mm in the extending direction of the flange portion 20, i.e., the flange portion 20 is coated or dripped with 0.1 to 0.25 mg per mm of length, such as 0.1 mg, 0.15 mg, 0.2 mg, 0.24 mg, 0.25 mg. Of course, the amount of the glue of the adhesive layer 30 may be less than 0.1 mg/mm, such as 0.09 mg/mm, 0.06 mg/mm, or the amount of the glue of the adhesive layer 30 may be may be larger than 0.25 mg/mm, such as 0.27 mg/mm, 0.30 mg/mm etc.

Figure 2:
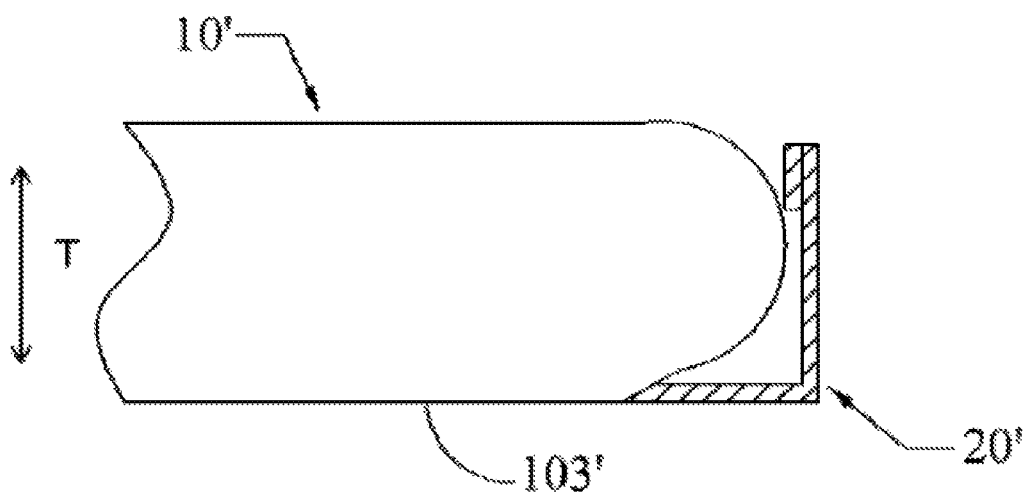
FIG. 2 is a view showing the structure of a battery provided in the comparative example.

In the following, the structure of the above embodiment is compared with the comparative example, wherein the present embodiment applies the battery shown in FIG. 1 in the present application, the flange portion 20 includes a protrusion segment 201 and an ending segment 202 simultaneously, and the amount of the glue of the adhesive layer 30 is controlled to 0.1 to 0.25 mg/mm; the structure of the battery of the comparative example is shown in FIG. 2, the flange portion 20' is perpendicular to the second plane 103' of the battery body 10'. Both batteries were simultaneously measured by a high-speed iron tensile machine with a peel strength greater than 12 N/8 mm and a relative humidity of 90% RH in the test environment. Specifically, the parameters and results of the two in the test are shown in Table 1.

TABLE 1

| battery | storage time | width before storage | width after storage | width difference before and after storage |
| --- | --- | --- | --- | --- |
| Present Embodiment | 30 days | 38.223 mm | 38.225 mm | 0.002 mm |
| Comparative Examples | 30 days | 38.240 mm | 38.308 mm | 0.068 mm |

From the comparison of the above embodiment with the comparative example, it can be seen that the width difference of the battery in the present application before and after storage is smaller than that of the comparative example, indicating that the opening of the flange portion 20 is small. Obviously, the embodiment of the present application may better reduce the opening of the flange portion 20 compared with the comparative example. Among them, the width before (or after) storage in Table 1 refers to the dimension of the battery in the width direction of the battery body 10 (10').

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. A battery, comprising:
   a battery body, and
   a flange portion,
   wherein the battery body comprises a side face protruding from a surface of the battery body;
   the flange portion is arranged outside the battery body and comprises a protrusion segment connected to the battery body, and the protrusion segment protrudes away from the battery body, wherein the protrusion segment is of a curved structure.

2. The battery according to claim 1, wherein the flange portion further comprises an ending segment connected to an end of the protrusion segment and located between the protrusion segment and the side face.

3. The battery according to claim 2, the battery body comprises a first plane and a second plane in a thickness direction of the battery body,
   wherein the protrusion segment is curved from an end of the second plane toward a side where the first plane is located; a connection between the ending segment and the protrusion segment is a starting end of the ending segment, and the distance of the starting end of the ending segment from the first plane is 0.2 to 0.5 mm.

4. The battery according to claim 3, wherein the distance of the end of the ending segment from a central plane of the battery body is greater than 0.2 mm, and the end of the ending segment is located between the first plane and the central plane in the thickness direction of the battery body.

5. The battery according to claim 2, further comprising an adhesive layer, wherein the adhesive layer is disposed between at least two of the protrusion segment, and the ending segment and the side face.

6. The battery according to claim 5, wherein a unit mass of the adhesive layer is 0.1 to 0.25 mg/mm in the thickness direction of the battery.

7. The battery according to claim 1, wherein a valley bottom of the side face is opposite to a valley bottom of the protrusion segment.

8. The battery according to claim 2, wherein a valley bottom of the side face is opposite to a valley bottom of the protrusion segment.

9. The battery according to claim 3, wherein a valley bottom of the side face is opposite to a valley bottom of the protrusion segment.

10. The battery according to claim 4, wherein a valley bottom of the side face is opposite to a valley bottom of the protrusion segment.

11. The battery according to claim 5, wherein a valley bottom of the side face is opposite to a valley bottom of the protrusion segment.

12. The battery according to claim 6, wherein a valley bottom of the side face is opposite to a valley bottom of the protrusion segment.

13. The battery according to claim 2, wherein a starting end of the ending segment is located between the first plane and the second plane in the thickness direction of the battery body.

14. The battery according to claim 3, wherein a starting end of the ending segment is located between the first plane and the second plane in the thickness direction of the battery body.

15. The battery according to claim 4, wherein a starting end of the ending segment is located between the first plane and the second plane in the thickness direction of the battery body.

16. The battery according to claim 5, wherein a starting end of the ending segment is located between the first plane and the second plane in the thickness direction of the battery body.

17. The battery according to claim 1, wherein the curved structure comprises an elliptical arc or a circular arc.

* * * * *